United States Patent [19]
Fukada

[11] Patent Number: 5,764,249
[45] Date of Patent: Jun. 9, 1998

[54] INFORMATION RECORDER ON BUNDLE OF ELECTRIC WIRES

[75] Inventor: Kazumitsu Fukada, Yokkaichi, Japan

[73] Assignee: Sumitomo Wiring Systems, Ltd., Mie, Japan

[21] Appl. No.: 381,324

[22] Filed: Jan. 31, 1995

[30] Foreign Application Priority Data

Feb. 2, 1994 [JP] Japan ................................ 6-010894

[51] Int. Cl.$^6$ ........................................ B41J 3/00
[52] U.S. Cl. ........................................ 347/2; 347/4
[58] Field of Search ............... 347/2, 4, 74; 364/468.19, 364/474.11

[56] References Cited

U.S. PATENT DOCUMENTS

| | | |
|---|---|---|
| 3,842,496 | 10/1974 | Mercer. |
| 4,265,687 | 5/1981 | Mercer et al.. |
| 4,387,665 | 6/1983 | Clinton. |
| 5,153,839 | 10/1992 | Cross ................ 364/468.19 |
| 5,428,377 | 6/1995 | Stoffel et al. ................ 347/15 |
| 5,455,606 | 10/1995 | Keeling et al. ................ 347/7 |
| 5,477,463 | 12/1995 | Tamura ................ 364/468.19 |

FOREIGN PATENT DOCUMENTS

| | | |
|---|---|---|
| 182592 | 5/1986 | European Pat. Off.. |
| 1536178 | 12/1978 | United Kingdom. |

OTHER PUBLICATIONS

European Search Report 95 30 0631 completed Dec. 5, 1996 and Annex.

*Primary Examiner*—N. Le
*Assistant Examiner*—Thinh Nguyen
*Attorney, Agent, or Firm*—Beveridge, DeGrandi, Weilacher & Young, LLP

[57] ABSTRACT

An information recorder on a bundle of electric wires for recording desired information on a bundle of electric wires is disclosed. In the information recorder, an adhesive-backed tape piece is wound around the bundle of electric wires, after which a part number, a production number and a conduction test passing mark of the bundle of electric wires are printed on the surface of the tape piece by an inkjet printer. Furthermore, a wiring harness producing apparatus comprising the information recorder on a bundle of electric wires is disclosed.

16 Claims, 18 Drawing Sheets

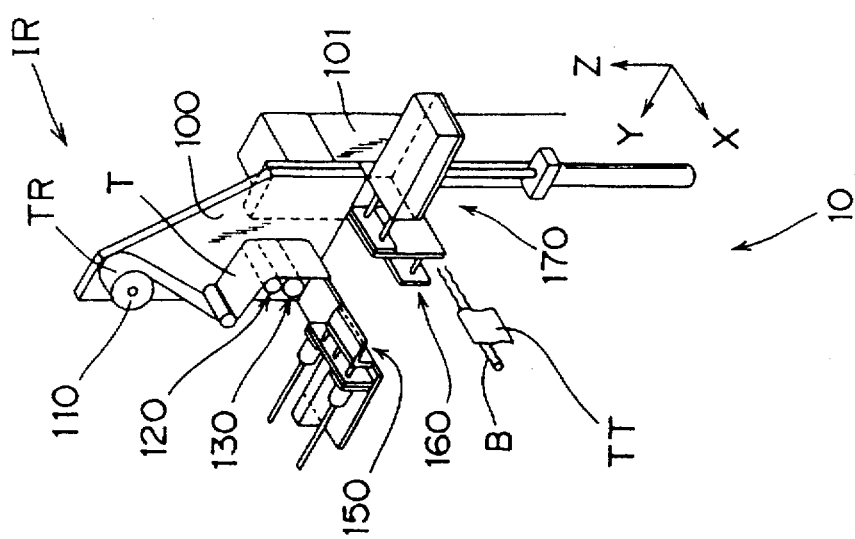
FIG. 1A
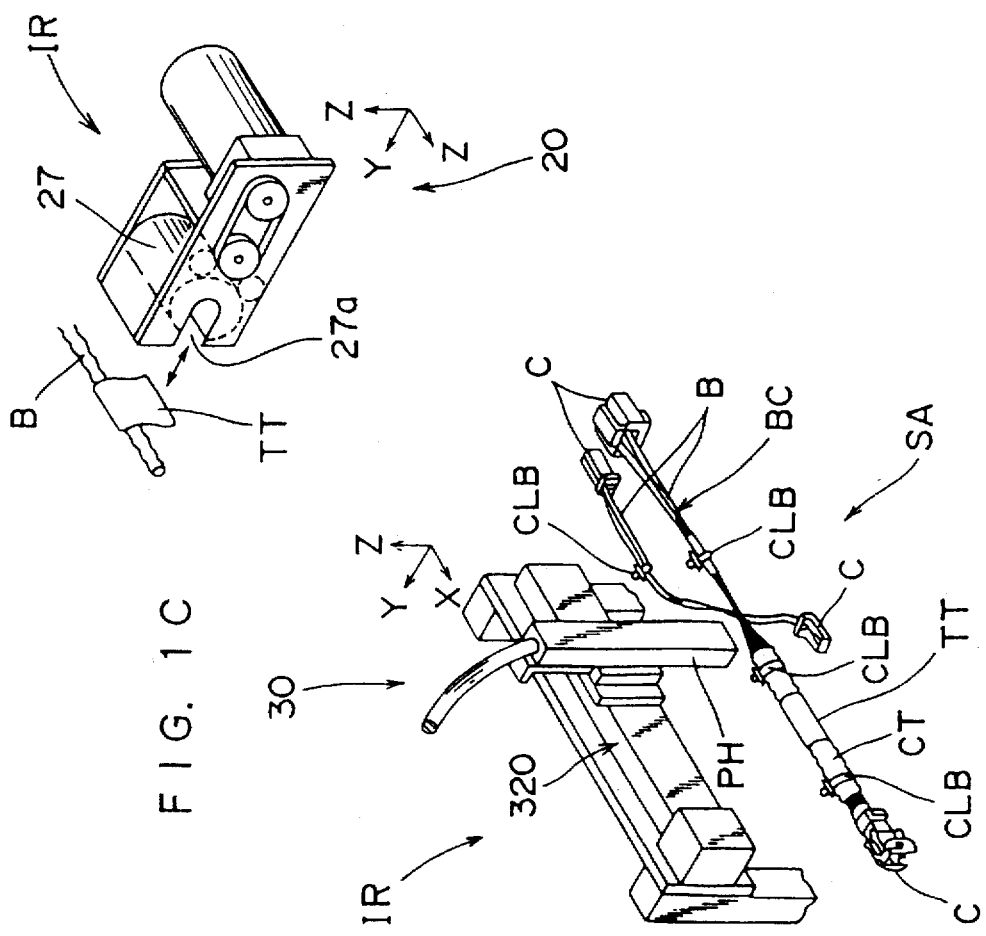
FIG. 1B
FIG. 1C

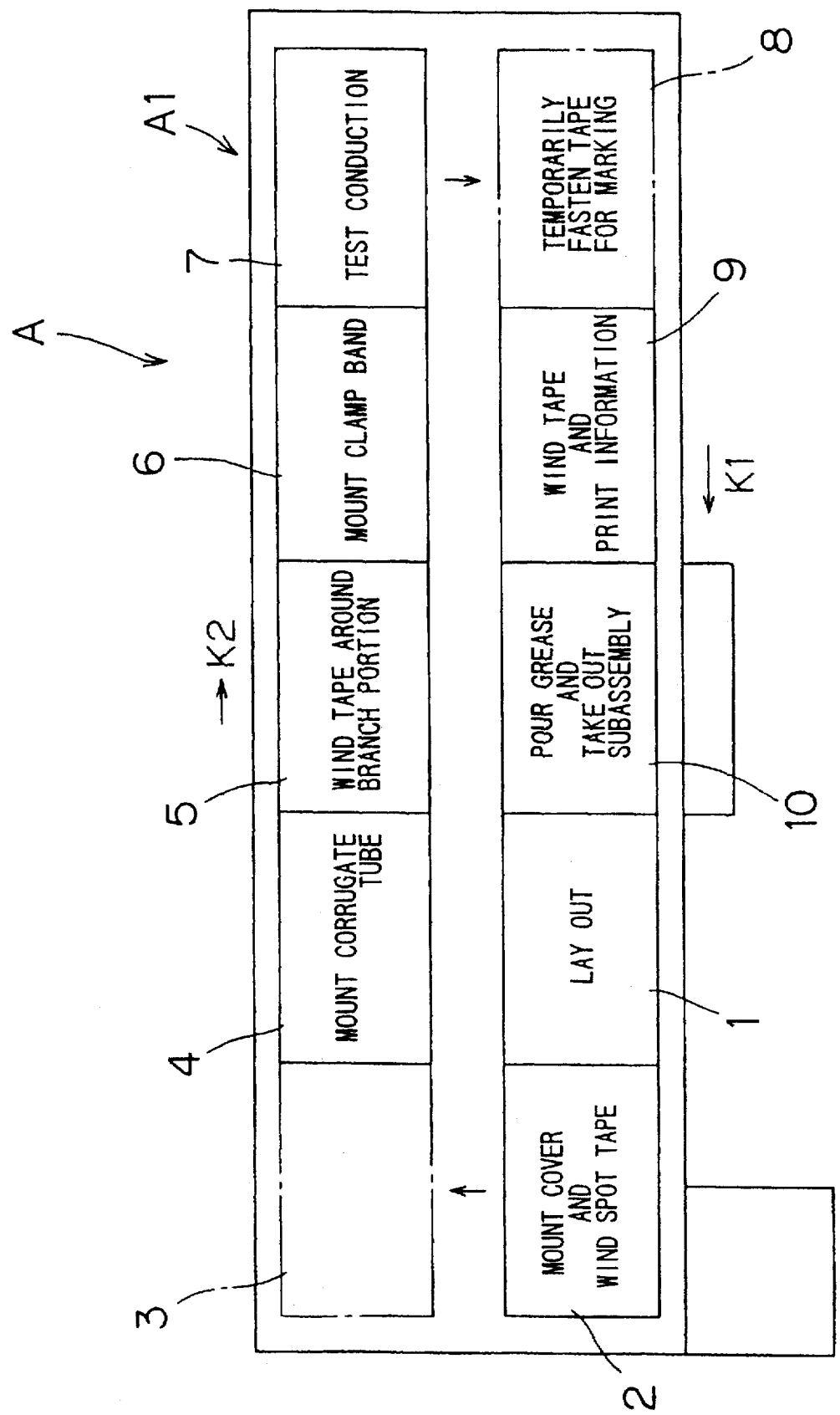

FIG. 15
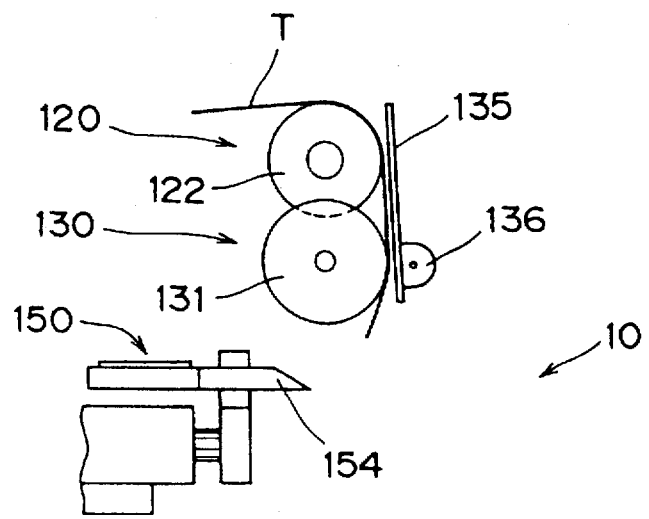
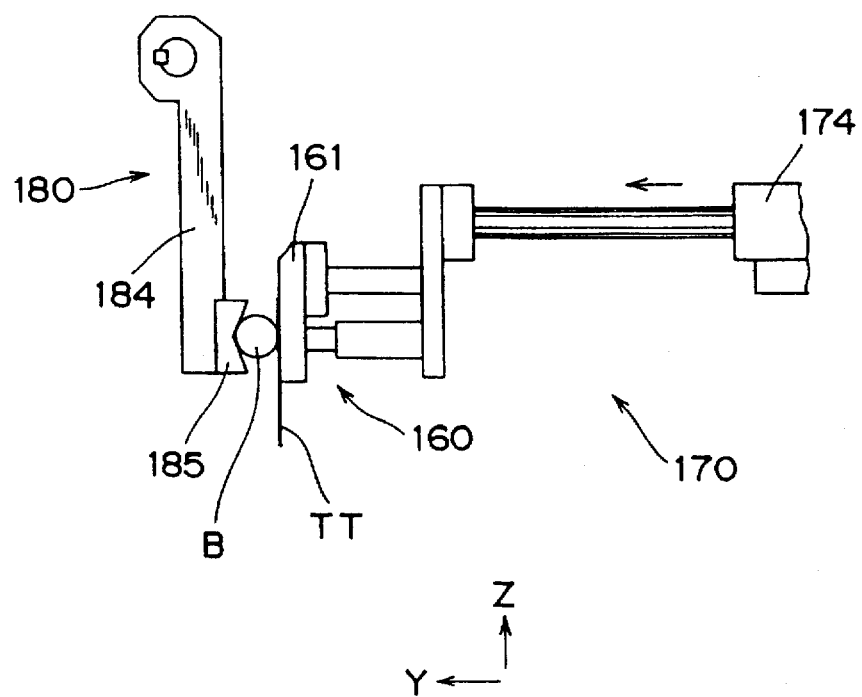

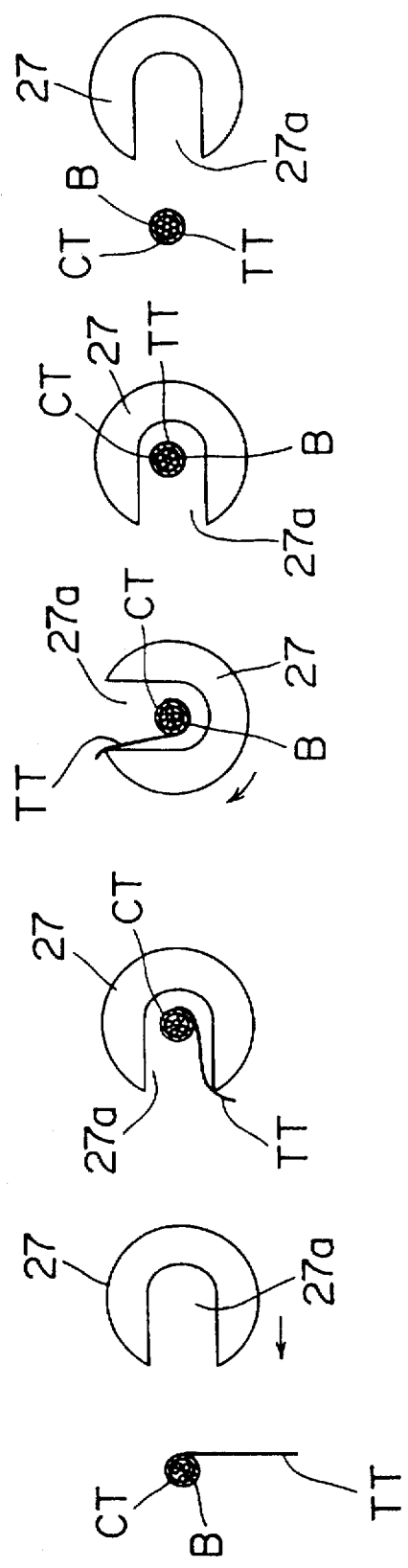

INFORMATION RECORDER ON BUNDLE OF ELECTRIC WIRES

CROSS REFERENCE TO RELATED APPLICATION

This application claims priority benefits under 35 USC §119 of Japanese Patent Application Serial No. 6-10894, the disclosure of which is incorporated by reference.

BACKGROUND OF THE INVENTION

1. Field of the Invention

The present invention relates to an information recorder on a bundle of electric wires for recording information such as a part number on the surface of a bundle of electric wires.

2. Description of the Related Art

A wiring harness for an automobile has been known as a part having a bundle of electric wires. The wiring harness is constructed by combining a lot of subassemblies, and each of the subassemblies is assigned a corresponding part number. In order to identity each of the subassemblies, a product number label given a corresponding part number, along with a serial number for each part number, is affixed to the subassembly. In many cases, the product number label is affixed to the surface of a corrugate tube with which a bundle of electric wires is coated.

The above described production number label has been conventionally affixed by hand in the order as shown in FIGS. 18A and 18B. Specifically, a production number label L is in a long narrow tape shape, and a part number is previously printed on one surface of the production number label L. One end La of the production number label L is mounted on a corrugate tube CT by a spot tape ST with the production number label L turned over, after which the other end Lb of the production number label L is folded back and mounted on the corrugate tube CT by the spot tape ST. At the time of affixing the production number label L, a conduction passing tape GT given a mark representing passing of a conduction test (hereinafter referred to as a conduction test passing mark) M is also generally affixed.

However, there are many types of production number labels, so that it is difficult to manage the production number labels, and the production number labels are liable to be erroneously affixed.

Furthermore, a tape piece wound around an uneven portion of a corrugate tube or the like enters an uneven state. Therefore, it is difficult to read a part number or the like printed on the tape piece.

Additionally, work for printing production numbers on production number labels is generally performed in a place spaced apart from a wiring harnesses production line. Work for conveying the production number labels to the wiring harnesses production line and disposing the production number labels in predetermined positions on the production line takes a lot of time and labor.

SUMMARY OF THE INVENTION

Therefore, an object of the present invention is to provide an information recorder on a bundle of electric wires capable of recording information on a bundle of electric wires efficiently and accurately and easily reading the recorded information.

In order to attain the above described object, in accordance with one aspect of the present invention, an information recorder on a bundle of electric wires is characterized by comprising an inkjet printer capable of printing desired information on the surface of a tape piece having a predetermined length which is wound around a predetermined portion of the bundle of electric wires and driving controlling means for controlling the driving of the inkjet printer in response to input of a signal related to the desired information.

In accordance with the aspect, the desired information is printed by the inkjet printer in a state where the tape piece is wound around the bundle of electric wires, thereby to make it easy to read the printed information. The possibility of erroneously affixing production number labels, for example, which has been conventionally existed, is eliminated. In addition, time and labor required to affix the production number labels and time and labor required to manage, convey and dispose, for example, the production number labels can be reduced. As a result, it is possible to record the information on the bundle of electric wires efficiently and accurately.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1A, 1B and 1C are schematic perspective views respectively showing devices in an information recorder according to one embodiment of the present invention, where FIG. 1A illustrates an operation of temporarily fastening a tape piece to a bundle of electric wires, FIG. 1B illustrates an operation of winding a tape piece around a bundle of electric wires, and FIG. 1C illustrates an operation of printing a production number and the like on a tape piece;

FIG. 2 is a schematic plan view illustrating the schematic construction of a processor in a wiring harness producing apparatus comprising an information recorder;

FIG. 15 is a schematic front view of the tape piece temporarily fastening device showing a state where a tape piece is temporarily fastened to a bundle of electric wires by the tape piece temporarily fastening mechanism and an auxiliary mechanism;

FIGS. 16A, 16B, 16C, 16D and 16E are schematic views of a taping wheel respectively sequentially showing an operation of winding a tape by a taping wheel in a tape piece winding device;

FIG. 17A illustrates a state where a bundle of electric wires is held by receiving plates and a clamping mechanism, and FIG. 17B illustrates a state where printing is done on a tape piece by a print head.

DETAILED DESCRIPTION OF THE PREFERRED EMBODIMENTS

Embodiments of the present invention will be described in detail with reference to the attached drawings.

Entire Construction

Figure 4:
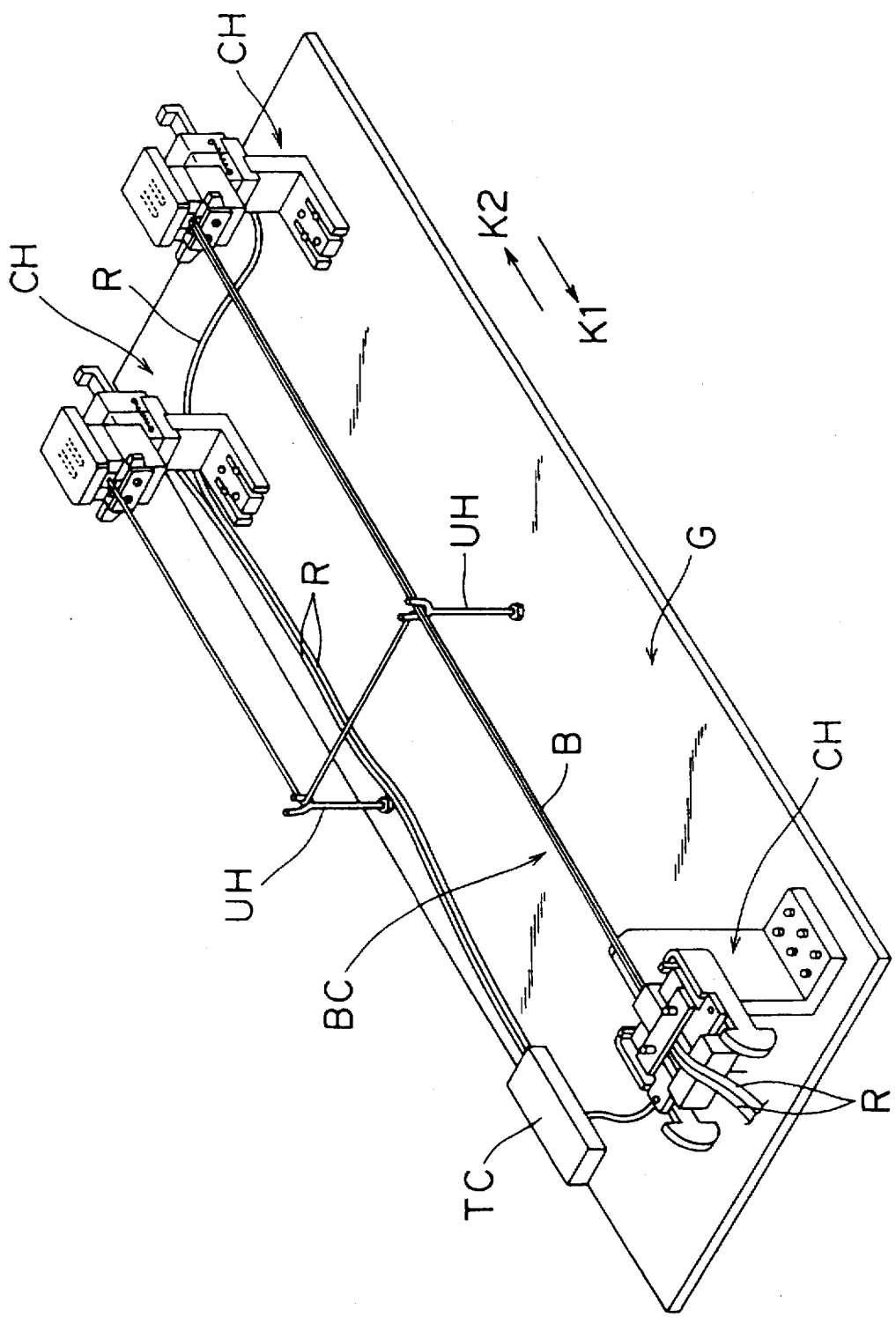
FIG. 4 is a schematic perspective view showing a wiring harness assembling board holding an electric wire assembly which is constituted by a bundle of electric wires and a connector.

FIG. 2 is a schematic plan view showing the construction of the line of a processor A1 which is a constituent element of a wiring harness producing apparatus A including an information recorder on a bundle of electric wires IR according to one embodiment of the present invention. FIG. 1 is a schematic perspective view sequentially showing the steps of information recording. FIG. 4 is a schematic perspective view showing a state where an electric wire assembly BC which is constituted by a bundle of electric wires B and a connector C is mounted on a wiring harness assembling board G which is caused to flow on the line.

Referring to FIG. 2, the wiring harness producing apparatus A is constructed as a subassembly line AL on which a wiring harness subassembly SA (hereinafter merely referred to as an assembly SA) is assembled by testing conduction of an electric wire assembly BC as shown in FIG. 4 and mounting exterior equipments such as a protective corrugate tube CT and a clamp band CLB with a grommet for mounting on a vehicle as shown in FIG. 1C on the electric wire assembly BC. The subassembly line AL is a circulating line having a front row and a rear row (the wiring harness assembling board G is conveyed in a direction of conveyance K1 on the line in the front row and a direction of conveyance K2 on the line in the rear row).

Figure 5:
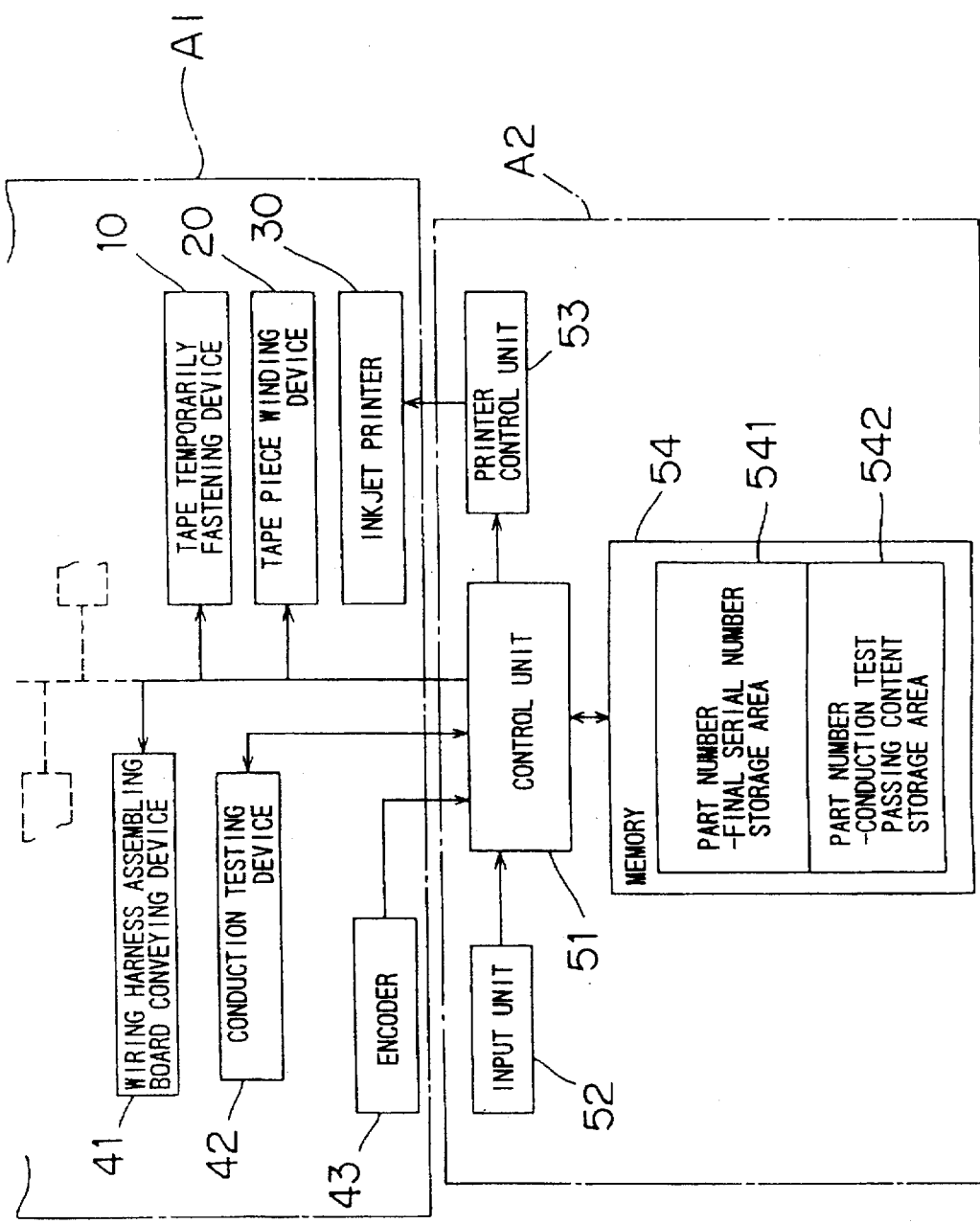
FIG. 5 is a block diagram showing the electrical construction of a principal part of the wiring harness producing apparatus.

Referring to FIG. 2, the following are sequentially set in the directions K1 and K2 of the flow on the subassembly line AL in the wiring harness producing apparatus A:

1) a first station 1 at which the electric wire assembly BC is laid out on the wiring harness assembling board G;

2) a second station 2 at which a cover is mounted and a spot tape is wound;

3) a third station 3 at which an empty space for moving the wiring harness assembling board G at the second station 2 on the line in the front row to the line in the rear row is ensured;

4) a fourth station 4 at which a corrugate tube is mounted;

5) a fifth station 5 at which a binding tape is wound around a branch portion of the electric wire assembly BC;

6) a sixth station 6 at which the clamp band CLB is mounted;

7) a seventh station 7 at which conduction of the electric wire assembly BC on which the exterior equipments have been mounted is tested by a conduction testing device 42 (see FIG. 5);

8) an eighth station 8 at which a tape piece for marking TT is temporarily fastened to the surface of the corrugate tube CT;

9) a ninth station 9 at which the tape piece TT temporarily fastened is wound around the bundle of electric wires B in the electric wire assembly BC, after which desired information is printed on the surface of the tape piece TT;

10) a tenth station 10 at which grease is poured into a predetermined portion of the subassembly SA completed, after which the subassembly SA is taken out.

Figure 3:
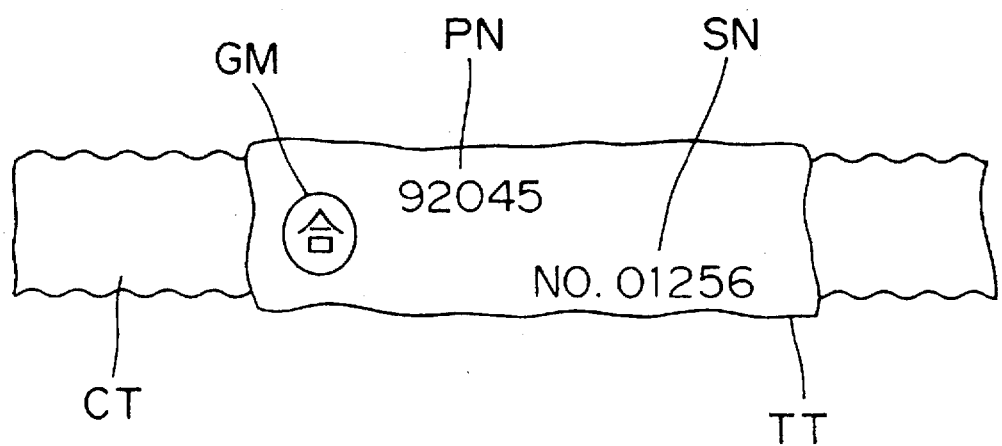
FIG. 3 is a schematic view of a tape piece for explaining information recorded on the tape piece.

The eighth station 8 and the ninth station 9 are stations for recording information. Examples of the information recorded by printing at the ninth station 9 include a part number PN, a serial number SN in order of production for identifying a part given the part number PN, and a conduction test passing mark GM of the subassembly SA, as shown in FIG. 3. The major feature of the present embodiment is that the part number PN and the like are printed on the tape piece TT which is affixed to the bundle of electric wires B without affixing the product number label previously printed to the bundle of electric wires B as in the conventional example.

A tape piece temporarily fastening device 10 for cutting an adhesive-backed tape T delivered from a feed reel 110 into a tape piece TT having a predetermined length and temporarily fastening the tape piece TT to a predetermined portion of the bundle of electric wires B is disposed, as shown in FIG. 1A, at the eighth station 8.

Furthermore, (1) a tape piece winding device 20 for winding the tape piece TT temporarily fastened around the predetermined portion of the bundle of electric wires B by a taping wheel 27 rotating, as shown in FIG. 1B, and (2) an inkjet printer 30 for printing desired information by a print head PH on the surface of the wound tape piece TT, as shown in FIG. 1C, are disposed at the ninth station 9. The tape piece temporarily fastening device 10, the tape piece winding device 20, the inkjet printer 30, and a controller A2 as described later constitute an information recorder IR. The tape piece winding device 20 and the inkjet printer 30 are disposed opposed to each other at the ninth station 9 (see FIG. 8). The direction of the X-axis in FIGS. 1A to 1C is along the direction of conveyance K1 of the wiring harness assembling board G (see FIGS. 2 and 4). The same is true for the other drawings.

Referring to FIG. 4, the electric wire assembly BC is held by a predetermined connector holding member CH and a U-shaped electric wire holding member UH which are fixed to the wiring harness assembling board G. The wiring harness assembling board G is conveyed in the directions of conveyance K1 and K2. As the wiring harness assembling board G, a plurality of types of wiring harness assembling boards are previously prepared depending on the production number of the subassembly SA to be assembled. The wiring harness assembling board G is conveyed with predetermined feed tact for each station in the directions of conveyance K1 and K2 which are directions of the flow on the subassembly line AL by a known wiring harness assembling board conveying mechanism (not shown) including a driving motor, a pulley, a chain and the like. The above described connector holding member CH holds the connector C in the electric wire assembly BC. A testing terminal (not shown) which is rendered conductive in contact with a terminal in the connector C is mounted inside the connector holding member CH. Lead wires R connected to the testing terminal are bundled and are connected to a testing connector TC. A worker on the line connects the testing connector TC to a corresponding connector in a conduction testing device 42 so that the conduction testing device 42 tests conduction at the time point where the wiring harness assembling board G reaches the seventh station 7 for testing conduction.

FIG. 5 is a block diagram showing the electrical construction of a principle part of a controller A2 which is a constituent element of the wiring harness producing apparatus. Referring to FIG. 5, the controller A2 is connected to the above described processor A1 (see FIG. 2) for controlling the driving of the processor A1.

Referring to FIG. 5, the controller A2 comprises a control unit 51 for controlling the whole of the wiring harness producing apparatus. Specifically, the controller A2 controls a wiring harness assembling board conveying device 41, a conduction testing device 42, and a tape temporarily fastening device 10, a tape piece winding device 20 and an inkjet printer 30 which constitute the information recorder IR, and the other devices (not shown). The control unit 51 is constituted by a CPU (Central Processing Unit) and the like. An input unit 52 composed of a keyboard or the like for inputting the part number PN recorded by the information recorder IR is connected to the control unit 51. Data representing the part number PN inputted by the input unit 52, a signal from the conduction testing device 42, and a signal from an encoder 43 (for measuring the amount of feed of a tape in the tape temporarily fastening device 10) are applied to the control unit 51.

A printer control unit 53 for controlling the inkjet printer 30 is connected to the control unit 51. The printer control unit 53 comprises a ROM (Random Access Memory) (not shown) for storing character patterns and the like.

Furthermore, a memory 54 is connected to the control unit 51. A part number—final serial number storage area 541 for storing the final serial number SN at the time of the preceding production for each part number PN is set in the memory 54. Further, a part number—conduction test passing content storage area 542 storing the content of passing of a conduction test in the conduction testing device 42 for each part number PN is set in the memory 54. If the part number PN is applied from the input unit 52, the final serial number SN at the time of the preceding production and the content of passing of a conduction test, which correspond to the part number PN, are read out to a working area in the control unit 51 from the storage area 541. The control unit 51 outputs a signal for causing the inkjet printer 30 to print the part number PN and the serial number SN to which one is added at a time, and compares the result of the conduction test by the signal from the conduction testing device 42 with the content of passing of the conduction test and outputs a signal for printing the conduction test passing mark GM to the printer control unit 53 if the electric wire assembly BC passes the conduction test.

Tape Piece Temporarily Fastening Device

Figure 6:
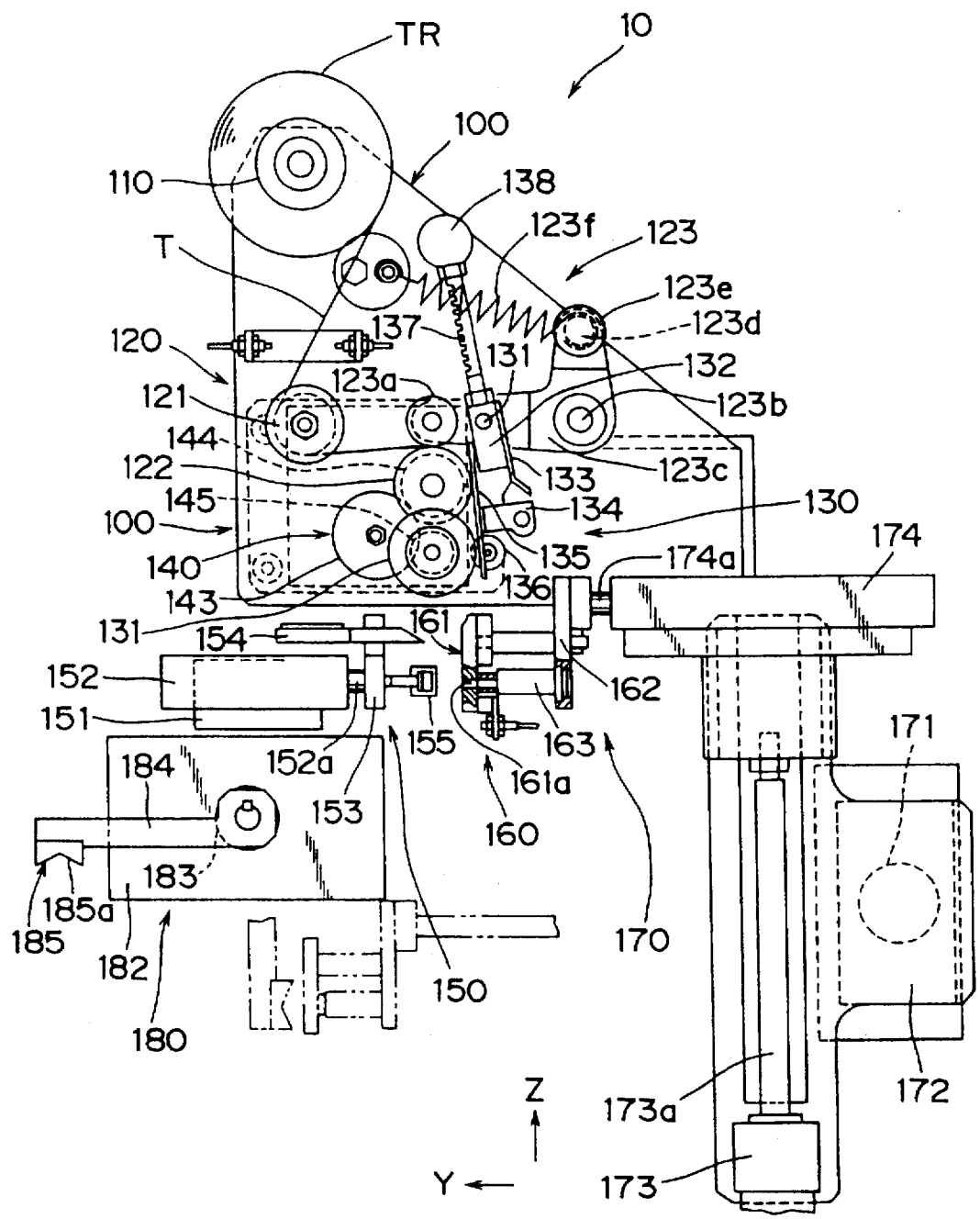
FIG. 6 is a front view showing a tape piece temporarily fastening device.
Figure 7:
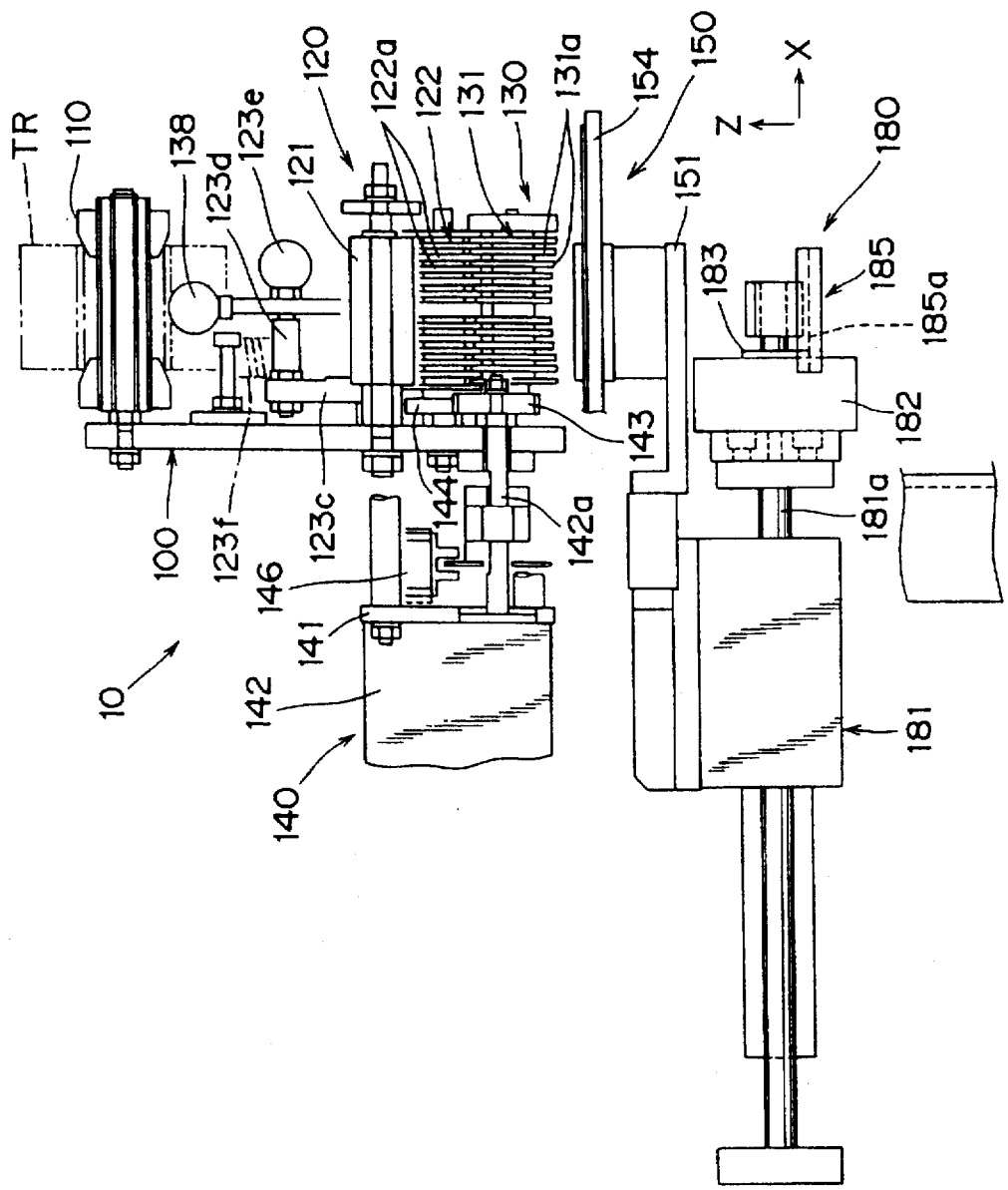
FIG. 7 is a side view showing the tape piece temporarily fastening device.

Referring to FIGS. 1, 6 and 7, a tape piece temporarily fastening device 10 comprises (1) a frame 100, (2) a feed reel 110 supported on the frame 100 for rotatably holding a tape roll TR, (3) a tape pull-out mechanism 120 for pulling out a tape T by a pull-out roller 122 from the tape roll TR, (4) a guiding and conveying mechanism 130 for guiding and conveying the tape T pulled out by a guide roller 131 so that the tape T hangs downward, (5) a driving mechanism 140 for rotating the pull-out roller 122 and the guide roller 131 in synchronism with each other, (6) a cutter mechanism 150 for cutting the tape T pulled out, (7) a tape piece temporarily fastening mechanism 170 having a tape piece holding mechanism 160 for holding a tape piece TT by air suction for affixing an upper end of the tape piece TT to a predetermined portion of the bundle of electric wires B and temporarily fastening the tape piece TT, and (8) an auxiliary mechanism 180 for holding the predetermined portion of the bundle of electric wires B and assisting in temporarily fastening the tape piece TT by the tape piece temporarily fastening mechanism 170 (not shown in FIGS. 1A, 1B and 1C). Each of the mechanisms 120, 130, 140, 170 and 180 is supported by the frame 100 and a pillar 101 for fixing the frame 100.

Tape Pull-out Mechanism

Referring to FIGS. 6 and 7, the tape pull-out mechanism 120 comprises an intermediate roller 121 for stabilizing the tape T in contact with an inviscid surface of the tape T from the feed reel 110, (2) a pull-out roller 122 for pulling out the tape T through the intermediate roller 121, and (3) a pressing mechanism 123 including a driven roller 123a rotating in synchronism with the pull-out roller 122 for pressing the tape T against the pull-out roller 122 through the driven roller 123a.

As shown in FIG. 7, a plurality of annular flanges 122a and 131a are projected for each predetermined spacing on peripheral surfaces of the pull-out roller 122 and the guide roller 131 in the guiding and conveying mechanism 130. The annular flanges 122a and 131a on both the rollers 122 and 131 are fitted to each other. Further, the annular flanges 122a and 131a are so constructed that the diameter is the smallest in the center in the axial direction of the rollers 122 and 131 and increases with distance from the center, and has a so-called drum shape as a whole.

Referring to FIG. 6, the above described pressing mechanism 123 comprises (1) the above described driven roller 123a, (2) a cantilever 123c composed of an angle-shaped plate member rotatably supported on the frame 100 by a shaft 123b and having the driven roller 123a rotatably supported on its end, (3) a shaft member 123d (see FIGS. 6 and 7) fixed to the other end of the cantilever 123c, (4) a grip 123e (see FIGS. 6 and 7) fixed to a front end of the shaft member 123d, and (5) a helical compression spring 123f interposed between a base end of the shaft member 123d and the shaft member 123d fixed to the frame 100 for rotating and urging the cantilever 123c in the counterclockwise direction in FIG. 6.

In the pressing mechanism 123, the driven roller 123a is pressed against the pull-out roller 122 through the cantilever 123c by an urging force of the helical compression spring 123f. The pressing makes it possible for the pull-out roller 122 to obtain a frictional force for conveying the tape T between the pull-out roller 122 and the tape T.

Guiding and Conveying Mechanism

Referring to FIG. 6, the above described guiding and conveying mechanism 130 comprises (1) the above described guide roller 131 rotated in synchronism with the pull-out roller 122, (2) a main body section 132 rotatably supported by the guide roller 131 provided in a portion of the cantilever 123c near the driven roller 123a, (3) a plate member 133 fixed to one surface of the main body section 132, (4) a plate member 135 rotatably supported on a lower end of the plate member 133 through a mounting member 134, the tape T being interposed between the plate member 135 and peripheral surfaces of the pull-out roller 122 and the guide roller 131, (5) a small diameter directing roller 136 rotatably supported on the plate member 135 and advancing between the adjacent annular flanges 131a in the center of the peripheral surface of the guide roller 131, and (6) an operating lever 137 having a grip 138 provided in its upper end and fixed to an upper end of the main body section 132.

In the guiding and conveying mechanism 130, the tape T is conveyed so as to hang downward from the guide roller 131 rotated with the tape T interposed between the guide roller 131 and the plate member 135. Further, the above described directing roller 136 is rotated while positioning the center in the direction of the width of the tape T in the center of the guide roller 136, so that the tape T can hang straight downward. The above described operating lever 137 is rotated at required time such as the time of updating the tape roll TR, thereby to separate the plate member 135 and the directing roller 136 from the guide roller 131. Consequently, it is possible to ensure a space where the tape T is to be set.

Driving Mechanism

Referring to FIG. 7, the above described driving mechanism 140 comprises (1) a plate 141 fastened to a rear surface of the frame 100 by a screw with predetermined spacing, (2) a motor 142 fixed to the frame 141, (3) a driving gear 143 (see FIGS. 6 and 7) penetrating the frame 100 and fixed to an end of a rotating shaft 142a of the motor 142 so as to be integrally rotatable, (4) a first driven gear 144 (see FIGS. 6 and 7) engaged with the driving gear 143 and connected to the pull-out roller 122 so as to be integrally rotatable, (5) a second driven gear 145 (see FIGS. 6 and 7) engaged with the driving gear 143 and connected to the guide roller 131 so as to be integrally rotatable, and (6) an encoder 146 for detecting the rotation and displacement of the motor 142 through a disk rotating integrally with the rotating shaft 142a.

In the driving mechanism 140, the motor 142 is rotated by predetermined rotation and displacement to drive the pull-out roller 122 and the guide roller 131, and the tape T is pulled out by a predetermined length from the tape roll TR so as to hang downward from the guide roller 131. A signal from the above described encoder 146 is applied to the above described control unit 51. In the control unit 51, the driving of the motor 142 is controlled on the basis of the signal to control the amount of pull-out of the tape T.

Cutter Mechanism

Referring to FIGS. 6 and 7, the above described cutter mechanism 150 comprises (1) a base 151 fixed to a predetermined portion of the frame 100, (2) an air cylinder 152 fixed to the base 151, (3) a cutting edge 154 fixed to a rod 152a of the air cylinder 152 through a mounting member 153, and (4) a microphotosensor 155 disposed on the mounting member 153.

In the cutter mechanism 150, the tape T hanging downward from the guide roller 131 is pressed against a holding plate 161 in the tape piece holding mechanism 160 and is cut. The microphotosensor 155 detects the distance from the holding plate 161. The expansion of the rod 152a is stopped in a state where the cutting edge 154 is just brought into contact with the holding plate 161 on the basis of the detected distance.

Tape Piece Temporarily Fastening Mechanism

Referring to FIG. 6, the above described tape piece temporarily fastening mechanism 170 comprises (1) an X-axis slider 172 slidable in the direction of the X-axis (the direction of the flow on the line) by an X-axis air cylinder 171, (2) a Z-axis air cylinder 173 fixed to the X-axis slider 172 for expanding and contracting a rod 173a in the direction of the Z-axis, (3) a Y-axis air cylinder 174 fixed to an upper end of the rod 173a for expanding and contracting the rod 174a in the direction of the Y-axis, and (4) the above described tape piece holding mechanism 160 disposed in a front end of the rod 174a for holding the tape T hanging from the guide roller 131 by air suction. The tape piece holding mechanism 160 is moved to a position, to which the tape piece TT is to be affixed, of the bundle of electric wires B on the wiring harness assembling board G by the expansion and contraction of each of the air cylinders 171, 173 and 174.

The tape piece holding mechanism 160 comprises (1) the above described holding plate 161 which can be brought into close contact with the tape T hanging from the guide roller 131, (2) a plate 162 disposed in parallel with the holding plate 161, fastened to the holding plate 161 by a screw, and fixed to the front end of the rod 174a of the Y-axis air cylinder 174, and (3) a pump (not shown) for sucking air through an opening 161a and a tube 163 which are formed in the holding plate 161.

Auxiliary Mechanism

Referring to FIGS. 6 and 7, the above described auxiliary mechanism 180 comprises (1) an air cylinder 181 for expanding and contracting a rod 181a in the direction of the X-axis, (2) a main body section 182 fixed to a front end of the rod 181a, (3) a motor 183 mounted on the main body section 182, (4) a swing lever 184 having its one end fixed to a rotating shaft 183a of the motor 183 so as to be integrally rotatable, and (5) an electric wire holding plate 185 having an electric wire holding recess 185a which is fixed to a front end of the swing lever 184 and is in a V shape in cross section.

The electric wire holding plate 185 is moved between a home position indicated by a solid line in FIG. 6 (a state where the longitudinal direction of the swing lever 184 is along the direction of the Y-axis) and a holding position indicated by a two-dot and dash line in FIG. 6 (a state where the longitudinal direction of the swing lever 184 is along the direction of the Z-axis) by the rotation of the swing lever 184 by the motor 183.

The air cylinder 181 causes the rod 181a to expand and contract in a state where the electric wire holding plate 185 is in the home position, so that the electric wire holding plate 185 is moved to a position in the direction of the X-axis which corresponds to a predetermined portion, to which the tape piece TT is to be affixed, of the bundle of electric wires B. Thereafter, the swing lever 184 is rotated by the motor 183, to move the electric wire holding plate 185 to the holding position, where the bundle of electric wires B is held by the electric wire holding plate 185.

Tape Piece Winding Device

Figure 8:
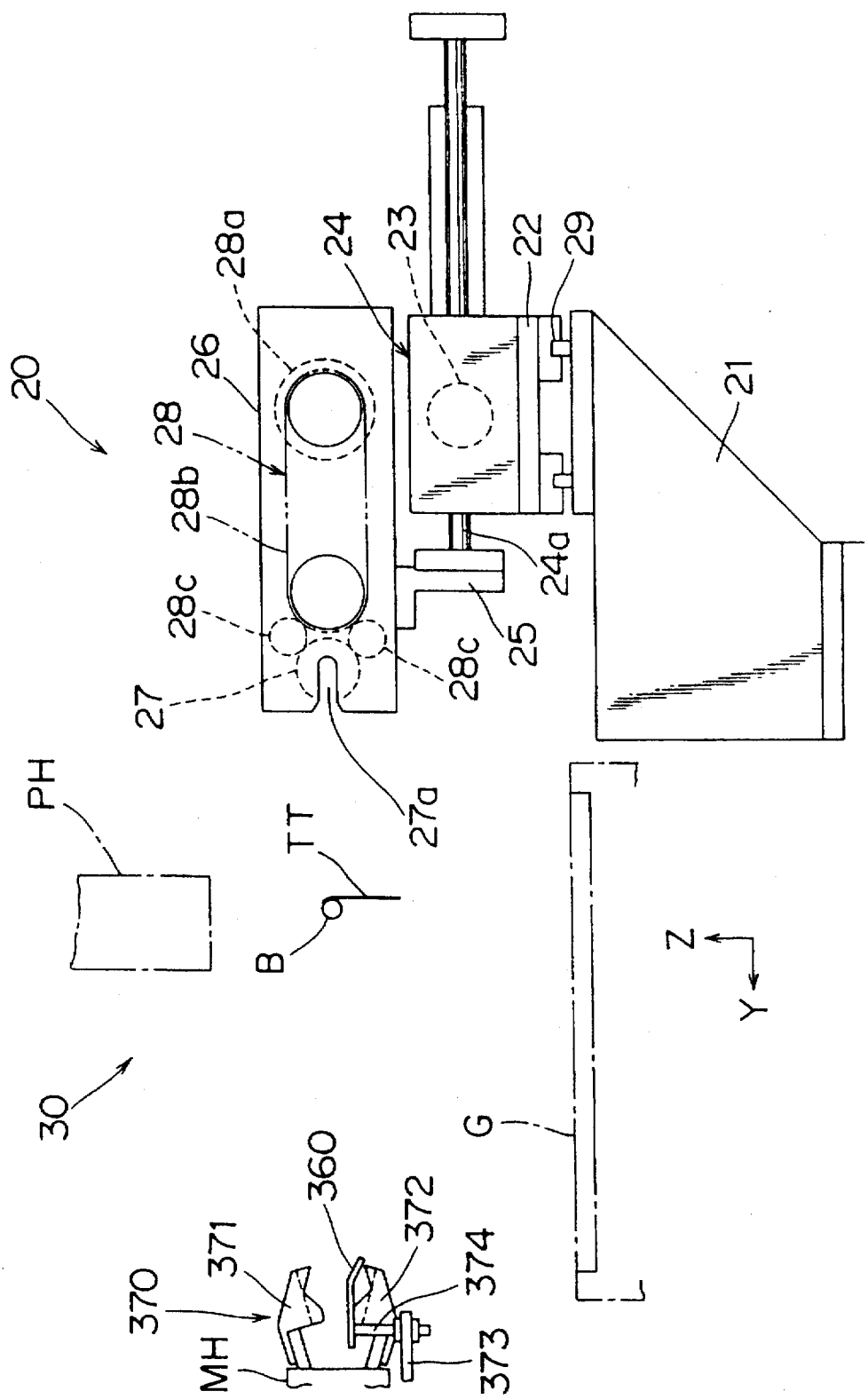
FIG. 8 is a schematic side view showing a tape piece winding device and an ink jet printer.

Referring to FIG. 8, the above described tape piece winding device 20 comprises (1) a base 21, (2) an X-axis slider 22 slidably provided in the direction of the X-axis on the base 21 through a known linear motion bearing 29, (3) an X-axis air cylinder 23 for moving the X-axis slider 22 to a required position in the direction of the X-axis, (4) a Y-axis air cylinder 24 comprising a double rod cylinder fixed to the X-axis slider 22, (5) a main body section 26 fixed to a front end of a rod 24a of the Y-axis cylinder 24 through a mounting member 25, (6) a taping wheel 27 provided on the main body section 26, and (7) a driving mechanism 28 comprising a motor 28a, a chain transmitting mechanism 28b and a transmission gear 28c which are mounted on the main body section 26 for rotating the taping wheel 27 through the chain transmitting mechanism 28b and the transmission gear 28c by the motor 28a.

A containing recess 27a into which the bundle of electric wires B with the tape piece TT can be introduced is formed in the taping wheel 27. The main body section 26 is moved to a position beside the tape piece TT affixed to the bundle of electric wires B on the wiring harness assembling board G as shown in FIG. 16A by the X-axis air cylinder 23, after which the taping wheel 27, along with the main body section 26, is moved by the Y-axis air cylinder 24, to introduce the bundle of electric wires B into the containing recess 27a in the taping wheel 27 as shown in FIG. 16B. Thereafter, the taping wheel 27 is rotated by the motor 28a as shown in FIG. 16C, thereby to wind the tape piece TT around the bundle of electric wires B as shown in FIG. 16D. The main body section 26 including the taping wheel 27 after the winding is separated from the bundle of electric wires B as shown in FIG. 16E.

Inkjet Printer

Figure 9:
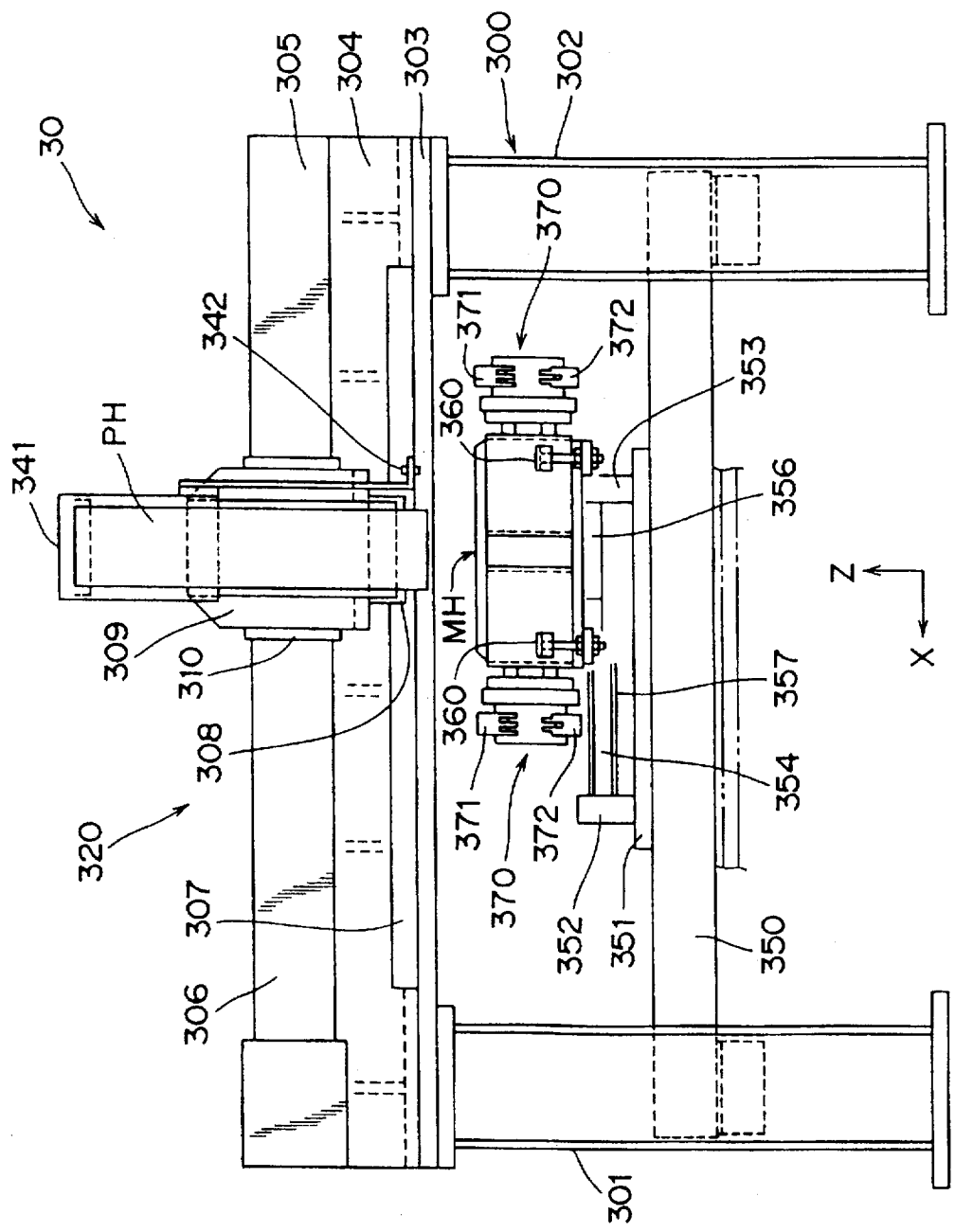
FIG. 9 is a schematic front view showing the inkjet printer.
Figure 10:
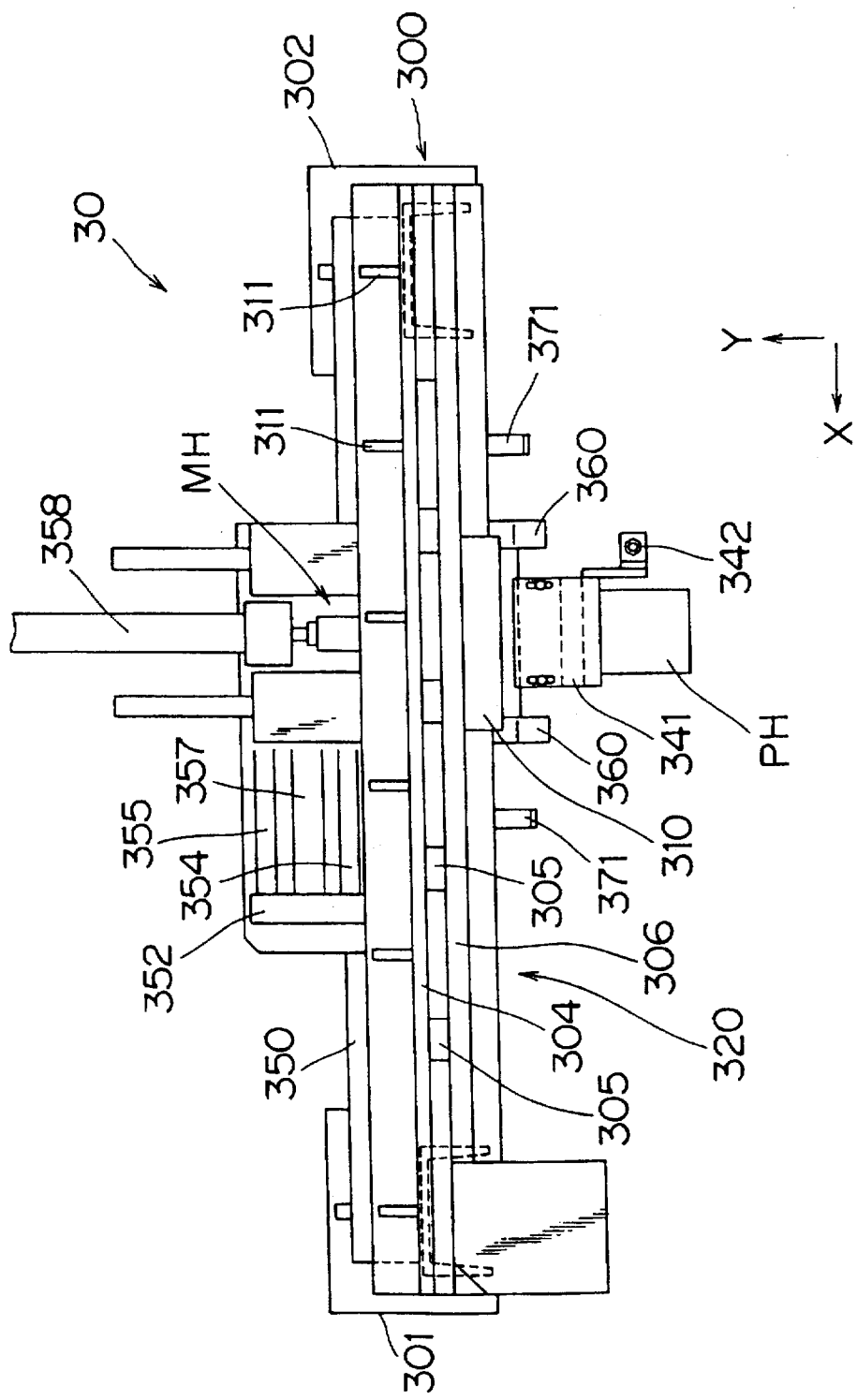
FIG. 10 is a schematic plan view showing the inkjet printer.
Figure 11:
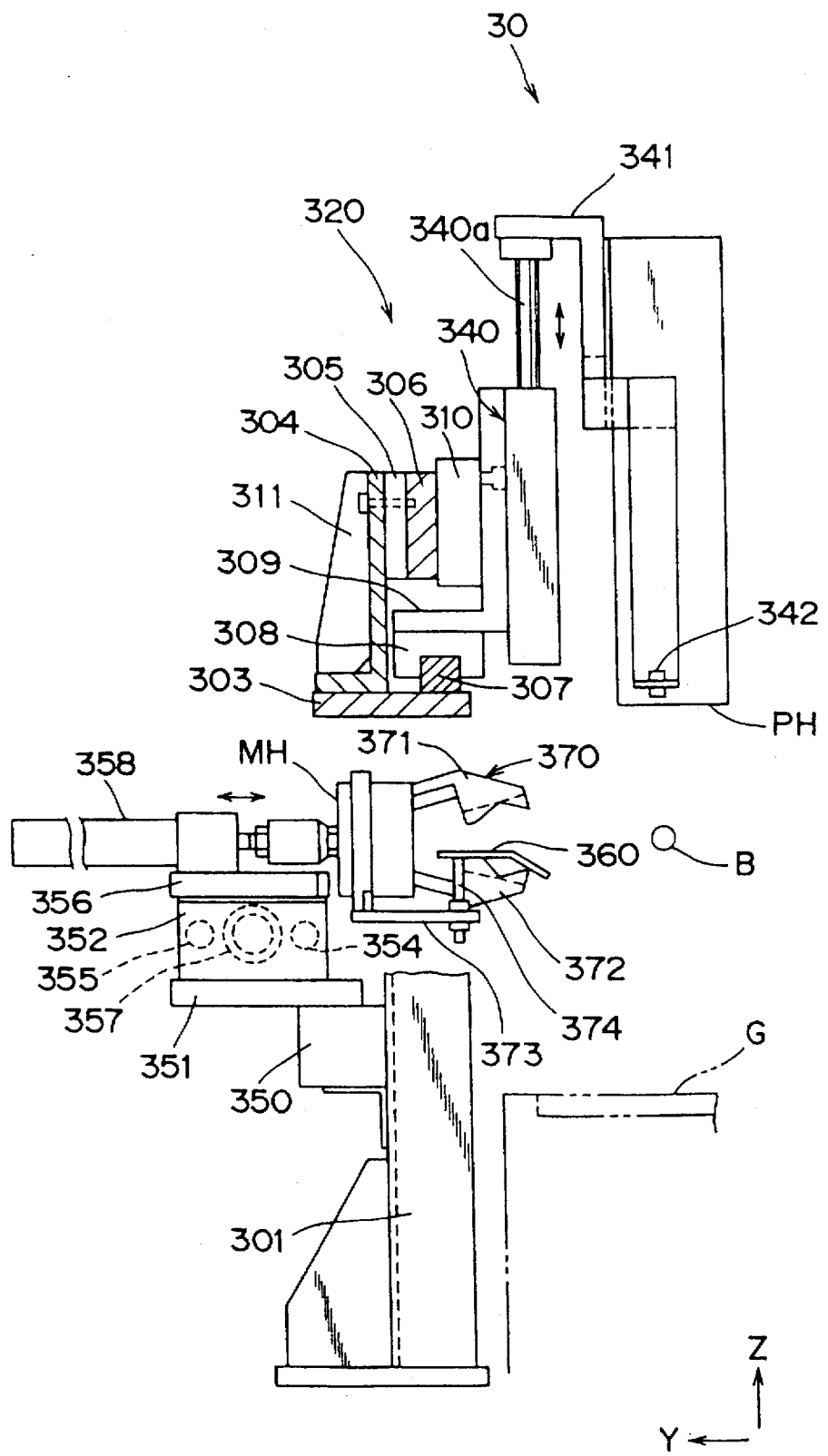
FIG. 11 is a schematic side view showing the inkjet printer.

Referring to FIGS. 9 to 11, an inkjet printer 30 comprises (1) a frame 300 comprising a pair of pillar bodies 301 and 302, a plate-shaped upper portion connecting member 303 disposed in a state where it is stretched between the pillar bodies 301 and 302, and the like, (2) a known uniaxial robot 320 supported on the upper portion connecting member 303 in the frame 300 and capable of uniaxially controlling an angle-shaped supporting plate 309 along the X-axis, (3) a Z-axis air cylinder 340 (see FIG. 11) fixed to the supporting plate 309, (4) a known print head PH of an inkjet type fixed to an upper end of a rod 340a of the Z-axis air cylinder 340 through a mounting member 341 and moved to a required position in the direction of the X-axis and the direction of the Z-axis by the uniaxial robot 320 and the Z-axis air cylinder 340, (5) a color sensor 342 disposed beside the print head PH and moved along with the print head PH for identifying the color of the tape piece TT, (6) a moving head MH provided in an upper surface portion of a central portion connecting member 350 stretched between approximately central portions in the direction of the height of the pillar bodies 301 and 302, (7) a pair of receiving plates 360 provided in the moving head MH for supporting a lower portion of the bundle of electric wires B at the time of printing, and (8) a pair of clamping mechanisms 370 respectively provided on both sides in the direction of the X-axis of the moving head MH for clamping the bundle of electric wires B in positions on both sides with a portion to be printed interposed therebetween.

Referring to FIG. 11, an angle member 304 is fixed to an upper surface portion of the upper portion connecting member 303, and a guide plate 306 is fastened to the angle member 304 by a screw through a spacer 305. In addition, a slide rail 307 extending in the direction of the X-axis is disposed in the upper surface portion of the connecting member 303, and a slider 308 is slidably fitted to the connecting member 303 along the slide rail 307. The angle-shaped supporting plate 309 is fixed to an upper surface portion of the slider 308. Referring to FIGS. 10 and 11, a sliding member 310 sliding along with the guide plate 306 is fixed to a rear surface portion of the supporting plate 309. Referring to FIGS. 10 and 11, a plurality of reinforcing ribs 311 are fixed to a rear surface portion of the angle member 304, to complete the strength of the angle member 304.

The above described uniaxial robot 320 moves the slider 308 and the supporting plate 309 to desired positions in the direction of the X-axis using a known feed screw mechanism or the like (not shown). The uniaxial robot 320 is controlled by the control unit 51. The control unit 51 moves the color sensor 342, along with the print head PH, in the direction of the X-axis, detects the position of the tape piece TT by the color sensor 342, and determines the position where printing is started by the print head PH depending on the detected position. Therefore, the printing can be started in a proper position of the tape piece TT. Further, the uniaxial robot 320 moves the print head PH in the direction of the X-axis at predetermined feed speed (to be printing speed) as the printing is done.

A deflecting electrode (not shown) for deflecting ink sprayed from a nozzle up and down and from right to left is mounted inside the print head PH. The printer control unit 53 controls an applied voltage to the deflecting electrode in accordance with the character patterns stored in the ROM to print required characters.

Referring to FIG. 9, a base section 351 is fixed to the center in the direction of the X-axis of the upper surface portion of the central portion connecting member 350. Referring to FIGS. 9 to 11, a pair of supporting plates 352 and 353 is fixed to both ends in the direction of the X-axis of an upper surface portion of the base section 351. A slider 356 is supported slidably in the direction of the X-axis by a pair of guide bars 354 and 355 connecting the supporting plates 352 and 353 to each other. The slider 356 is moved to a required position in the direction of the X-axis by an X-axis air cylinder 357. In addition, the above described moving head MH supported on the slider 356 so as to be relatively movable in the direction of the Y-axis through a Y-axis air cylinder 358 is disposed on an upper surface portion of the slider 356. The moving head MH is moved to a required position in the direction of the X-axis by the X-axis air cylinder 357 and then, is moved by the Y-axis air cylinder 358 to a position retreating in the direction of the Y-axis so as not to interfere with the wiring harness assembling board G and an advancing position where the bundle of electric wires B held on the wiring harness assembling board G can be held.

Each of the receiving plates 360 is supported on the moving head MH through a stay 373 fixed to a lower end of the moving head MH and a supporting bar 374 fastened to the stay 373 by a screw.

Each of the clamping mechanisms 370 has a pair of upper and lower clamp claws 371 and 372 between which the bundle of electric wires B can be clamped. The clamp claws 371 and 372 swing around their base ends to increase and decrease the spacing therebetween.

Operation

Referring now to FIGS. 12 to 17B, description is made of an information recording operation at the eighth station 8 and the ninth station 9.

Referring now to FIGS. 12 to 15, an operation of temporarily fastening a tape on a bundle of electric wires B will be described.

Figure 12:
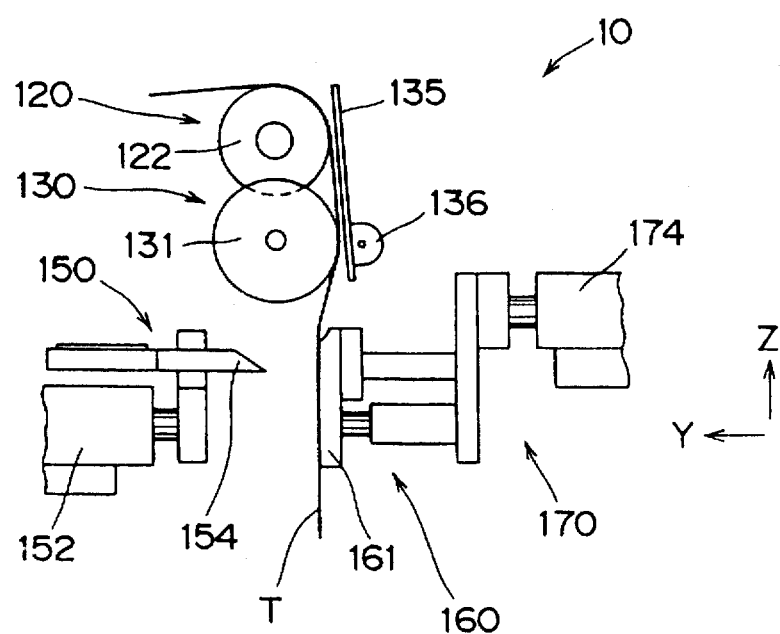
FIG. 12 is a schematic front view of the tape piece temporarily fastening device showing an operation of pulling out a tape by a tape pull-out mechanism.

1) As shown in FIG. 12, the tape T having a predetermined length is pulled out by the pull-out roller 122 in the pull-out mechanism 120 to hang downward from the guide roller 131, after which the tape T is adsorbed on the holding plate 161 in the tape piece holding mechanism 160 by air suction.

Figure 13:
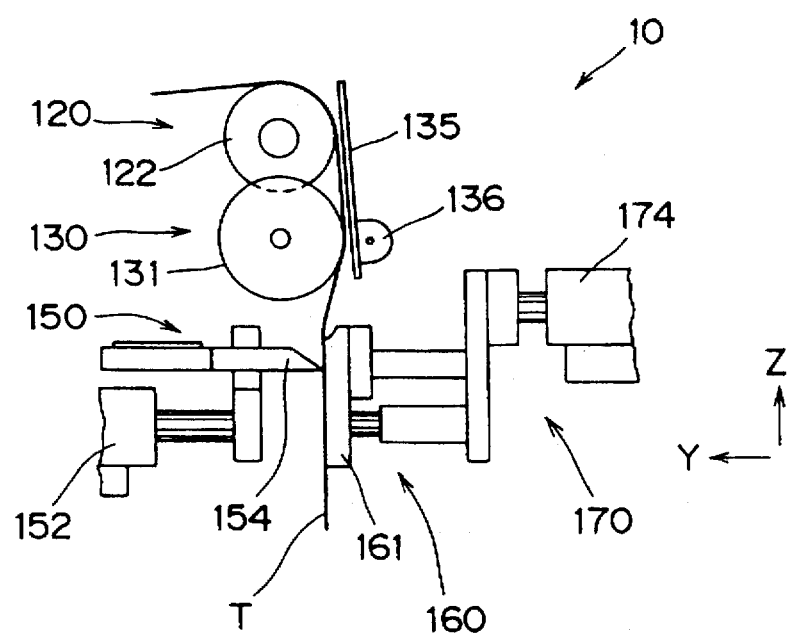
FIG. 13 is a schematic front view of the tape piece temporarily fastening device showing an operation of cutting a tape piece by a cutter mechanism.

2) As shown in FIG. 13, the cutter mechanism 150 then causes the cutting edge 154 to advance by the Y-axis air cylinder 152, and cuts a predetermined position of the tape T to obtain the tape piece TT having a predetermined length.

Figure 14:
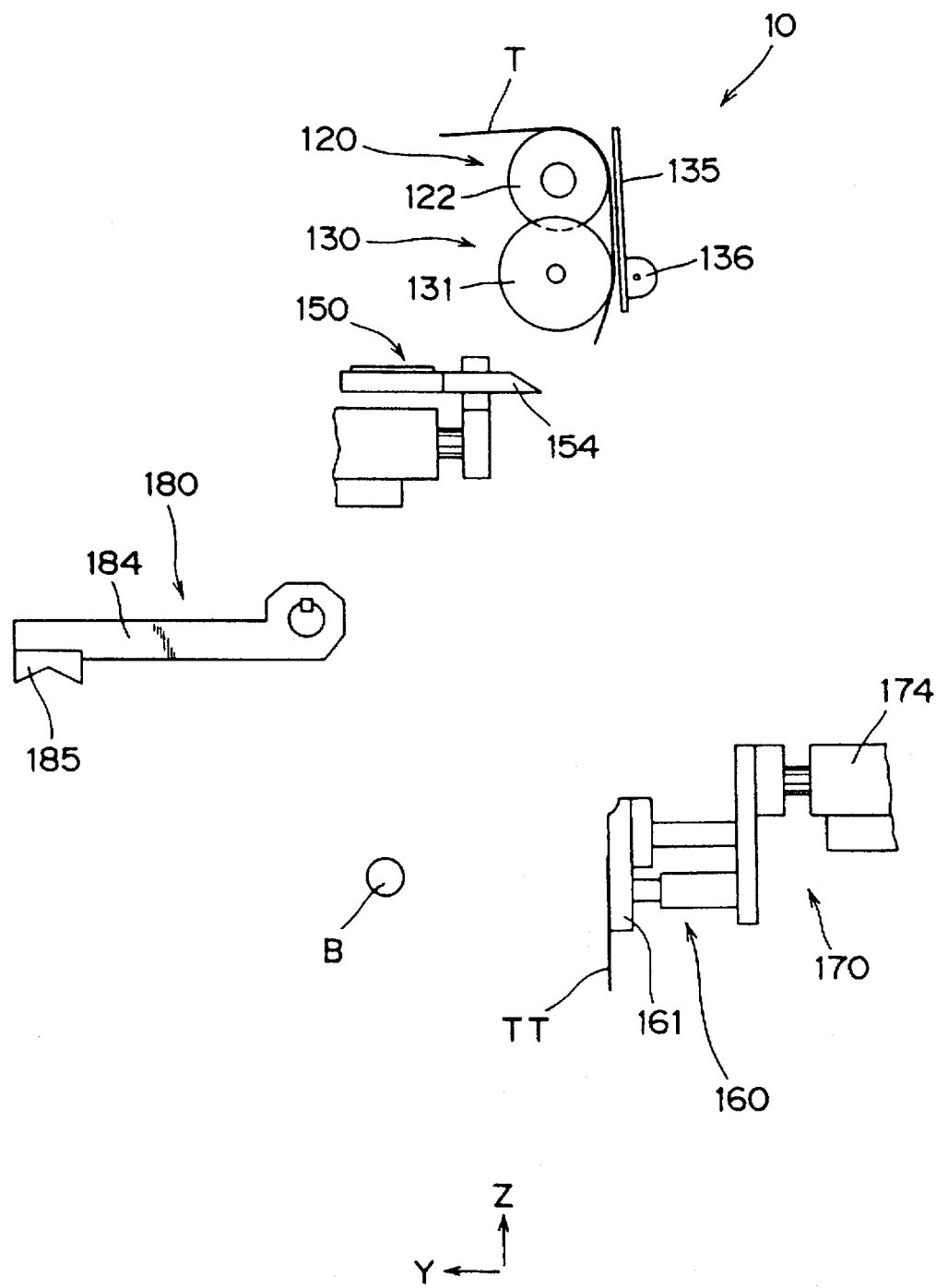
FIG. 14 is a schematic front view of the tape piece temporarily fastening device showing a state where a tape piece held by a tape piece temporarily fastening mechanism is lowered.

3) As shown in FIG. 14, the tape piece TT held by the holding plate 161 in the tape piece holding mechanism 160 is then lowered to a position beside the bundle of electric wires B. At this time, the swing lever 184 in the auxiliary mechanism 180 is in the home position.

4) The auxiliary mechanism 180 then rotates the swing lever 184, and causes the electric wire holding plate 185 to hold the bundle of electric wires B, thereby to regulate the movement of the bundle of electric wires B in the direction of the Y-axis. In this state, the tape piece temporarily fastening mechanism 170 presses the holding plate 161 against the bundle of electric wires B by the Y-axis air cylinder 174, to affix the tape piece TT to the bundle of electric wires B and temporarily fasten the tape piece TT.

If the wiring harness assembling board G holding the bundle of electric wires B to which the tape piece TT is temporarily fastened in the above described manner is moved to the ninth station 9, the taping wheel 27 (see FIG. 8) in the tape piece winding device 20, along with the main body section 26, is moved to the bundle of electric wires B, so that the tape piece TT is wound around the bundle of electric wires B by the above described operations shown in FIGS. 16A to 16E.

Figure 17A:
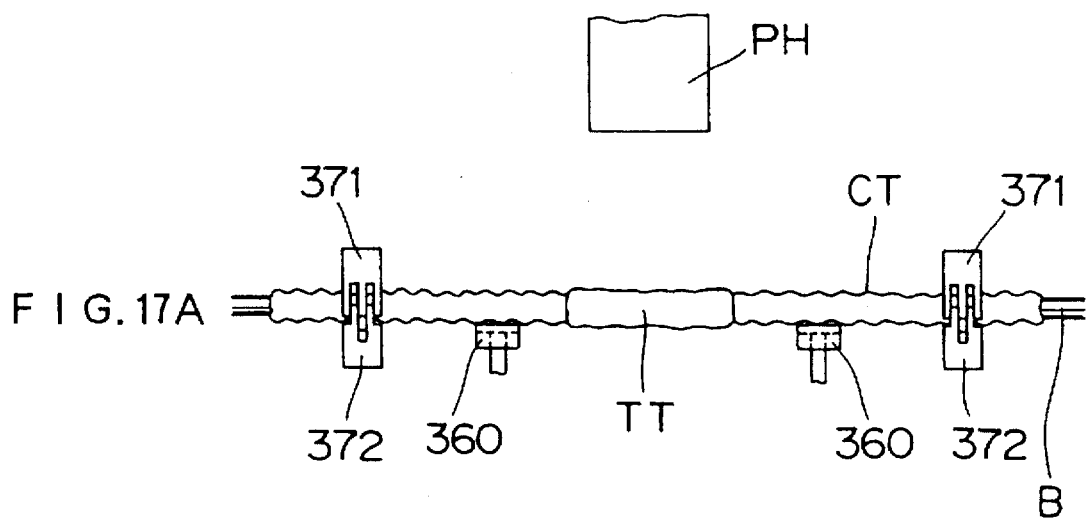
FIGS. 17A and 17B are schematic front views of an inkjet printer sequentially showing a printing operation of the inkjet printer, where
Figure 17B:
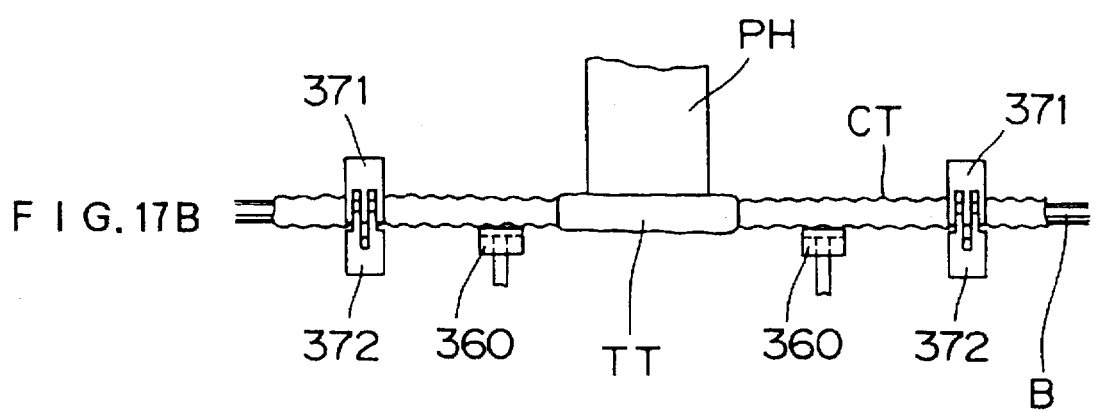
Figure 18A:
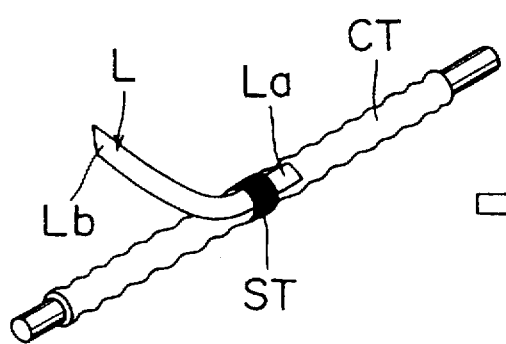
FIGS. 18A and 18B are schematic perspective views showing an operation of mounting a production number label on a bundle of electric wires in the conventional example.
Figure 18B:
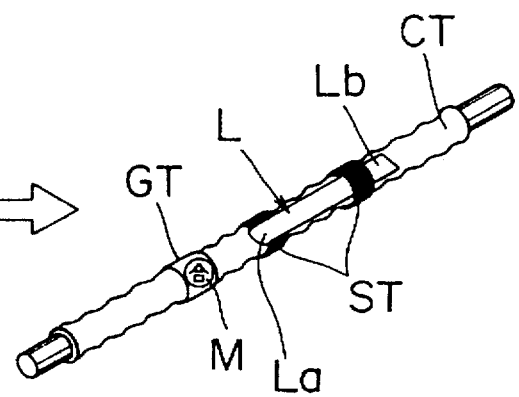

The moving head MH (see FIG. 11) in the inkjet printer 30 then advances, so that the clamping mechanisms 370 clamp the corrugate tube CT in positions on both sides with the tape piece TT interposed therebetween, as shown in FIG. 17A. In addition, the receiving plates 360 receive a lower portion of the corrugate tube CT, to regulate the downward movement. In this state, the print head PH is lowered, to print the production number PN and the like on the tape piece TT. The subassembly SA including the bundle of electric wires B on which information has been recorded is moved to the tenth station 10, where grease is poured into the subassembly SA, after which the subassembly SA is removed from the wiring harness assembling board G.

According to the present embodiment, desired information is printed by the inkjet printer 30 in a state where the tape piece TT is wound around the bundle of electric wires B, whereby the printed information is easily read. The possibility of erroneously affixing the production number labels, for example, which has been conventionally existed, is eliminated. Further, time and labor required to affix the production number labels and time and labor required to manage, convey, dispose, for example, the production number labels can be reduced. As a result, it is possible to record information on the bundle of electric wires B efficiently and accurately.

Furthermore, information corresponding to the specification of the subassembly SA which is conveyed to the inkjet printer 30 is printed, thereby to make it possible to record information without errors.

Additionally, the position of the tape piece TT wound is detected by the color sensor 342, and the position where printing is started by the inkjet printer 30 is determined depending on the detected position, thereby to make it possible to record information on the tape piece TT without errors. Particularly, the color sensor 342 is used for detecting the position of the tape piece TT, thereby to make it possible to detect the position at low cost.

Moreover, the conduction test passing mark GM is printed on the tape piece TT. Accordingly, the necessity of work for affixing conduction passing labels, which has been conventionally performed individually by hand, can be eliminated, thereby to make it possible to improve the efficiency of wiring harness producing work.

Furthermore, the tape piece temporarily fastening device 10 for temporarily fastening the tape piece TT is separated from the winding device 20. Accordingly, it is also possible to combine a plurality of tape piece temporarily fastening devices with one winding device. In this case, it is possible to selectively feed tape pieces which differ in color and width.

The present invention is not limited to the above described embodiments. Various design changes can be made in the range in which the gist of the present invention is not changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information recorder on a bundle of electric wires, comprising:

an inkjet printer for printing desired information on a surface of a tape piece having a predetermined length and wound around a predetermined portion of the bundle of electric wires;

driving controlling means for controlling driving of said inkjet printer in response to input of a signal related to said desired information; and a tape piece winding device for winding said tape piece around the predetermined portion of the bundle of electric wires, wherein said tape piece winding device comprises a wheel having a recess into which said tape piece and the predetermined portion of the bundle of electric wires is introduced in a state where a part of said tape piece is temporarily fastened to the predetermined portion of the bundle of electric wires and rotatable around the predetermined portion of the bundle of electric wires.

2. The information recorder on a bundle of electric wires according to claim 1, wherein said desired information includes at least one selected from a group of a part number, a production number and a mark representing passing of a conduction test of the bundle of electric wires.

3. The information recorder on a bundle of electric wires according to claim 1, further comprising information outputting means for outputting said signal to said driving controlling means.

4. The information recorder on a bundle of electric wires according to claim 1 wherein said tape piece winding device winds said tape piece around an uneven protective tube with which a periphery of the predetermined portion of the bundle of electric wires is coated.

5. An information recorder on a bundle of electric wires according to claim 1, further comprising means for holding the bundle of electric wires such that the surface of the tape piece wound around the bundle of electric wires is disposed in opposition to a print head of said inkjet printer.

6. An information recorder for a bundle of electric wires, comprising:
- an inkjet printer for printing desired information on a surface of a tape piece having a predetermined length and wound around a predetermined portion of the bundle of electric wires;
- driving controlling means for controlling driving of said inkjet printer in response to input of a signal related to said desired information;
- a tape piece winding device for winding said tape piece around the predetermined portion of the bundle of electric wires; and
- a tape piece temporarily fastening device comprising means for cutting a longitudinal tape delivered from a roll around which the tape is wound to obtain said tape piece and for temporarily fastening a part of said tape piece obtained by cutting to the predetermined portion of said bundle of electric wires.

7. A wiring harness producing apparatus comprising:
- an assembly line on which a wiring harness assembling board holding a bundle of electric wires so as to assemble a wiring harness is conveyed in predetermined directions of conveyance;
- a plurality of stations disposed along said assembly line; and
- an information recorder on a bundle of electric wires disposed at one of said plurality of stations for recording desired information on said bundle of electric wires, said information recorder including an inkjet printer for printing desired information on a surface of a tape piece having a predetermined length and wound around a predetermined portion of said bundle of electric wires held by said wiring harness assembling board, driving controlling means for controlling driving of said inkjet printer in response to input of a signal related to said desired information, and a tape piece winding device disposed at one of said plurality of stations for winding said tape piece around a predetermined portion of said bundle of electric wires, wherein
- said tape piece winding device includes a wheel having a recess into which said tape piece and the predetermined portion of said bundle of electric wires is introduced in a state where a part of the tape piece is temporarily fastened to the predetermined portion of the bundle of electric wires and rotatable around the predetermined portion of the bundle of electric wires.

8. The wiring harness producing apparatus according to claim 7, further comprising:
- information outputting means for outputting said signal to said driving controlling means, and wherein
- said desired information includes a mark representing passing of a conduction test of said wiring harness, and
- said information outputting means comprises a conduction testing device disposed at one of said plurality of stations for testing a conduction of said wiring harness and outputting a signal corresponding to a result of the test to said driving controlling means.

9. The wiring harness producing apparatus according to claim 8, wherein
- said desired information is suitable for a specification of said bundle of electric wires which is conveyed on said assembly line.

10. The wiring harness producing apparatus according to claim 7, wherein
- said desired information also includes at least one selected from a group of a part number, and a production number.

11. The wiring harness producing apparatus according to claim 8, wherein
- said information outputting means comprises storing means in which said desired information is previously stored.

12. The wiring harness producing apparatus according to claim 7, further comprising:
- a tape piece position detecting means for detecting a position of said tape piece which is wound around the predetermined portion of said bundle of electric wires, and
- moving means for moving a print head of said inkjet printer to a position of said tape piece which is detected by said tape piece position detecting means.

13. The wiring harness producing apparatus according to claim 12, wherein
- said tape piece position detecting means comprises a color identifying sensor.

14. The wiring harness producing apparatus according to claim 7, wherein
- said tape piece winding device winds said tape piece around an uneven protective tube with which a periphery of said predetermined portion of said bundle of electric wires is coated.

15. The wiring harness producing apparatus according to claim 7, further comprising:
- holding means for respectively holding portions on both sides with said predetermined portion of said bundle of electric wires interposed therebetween when said desired information is printed by said inkjet printer.

16. A wiring harness producing apparatus comprising:
- an assembly line on which a wiring harness assembling board holding a bundle of electric wires so as to assemble a wiring harness is conveyed in predetermined directions of conveyance;
- a plurality of stations disposed along said assembly line; and
- an information recorder for a bundle of electric wires disposed at one of said plurality of stations for recording desired information on said bundle of electric wires,
- said information recorder for a bundle of electric wires including
   - an inkjet printer for printing desired information on a surface of a tape piece having a predetermined length and wound around a predetermined portion of said bundle of electric wires held by said wiring harness assembling board,
   - driving controlling means for controlling driving of said inkjet printer in response to input of a signal related to said desired information,
   - a tape piece winding device disposed at one of said plurality of stations for winding said tape piece around a predetermined portion of said bundle of electric wires, and
   - a tape piece temporarily fastening device comprising means for cutting a longitudinal tape delivered from a roll around which the tape is wound to obtain said tape piece and for temporarily fastening a part of said tape piece obtained by cutting on the predetermined portion of said bundle of electric wires.

* * * * *